2,891,068

QUATERNARY AMMONIUM ACYL DERIVATIVES OF VITAMIN A ALDEHYDE HYDRAZONES

Takuichi Miki, Amagasaki, and Yujiro Hara, Kobe, Japan, assignors to Takeda Pharmaceutical Industries, Ltd., Doshomachi, Higashi-ku, Osaka, Japan No Drawing. Original application July 15, 1957, Serial No. 671,732. Divided and this application June 17, 1958, Serial No. 748,554

Claims priority, application Japan July 20, 1956

2 Claims. (Cl. 260—295)

This invention relates to new and useful derivatives of vitamin A aldehyde and to the preparation of such derivatives, the latter being characterized by vitamin A activity.

Vitamin A aldehyde (retinene) is a pentaenaldehyde and is produced by oxidation of vitamin A alcohol obtained from cod liver oil, etc., or by synthesis from β-ionone via a number of intermediates. Vitamin A aldehyde is asserted to have a vitamin A activity equal to that of vitamin A alcohol, but is somewhat less stable than the latter. Vitamin A aldehyde, as well as vitamin A, is usually obtained as a water-insoluble oily substance, and these properties are inconvenient in the working up of the materials into a form useful for medicinal purposes. Efforts have therefore been made to convert the said materials into solid form as well as to solubilize the vitamin A oil, with increase in the stability.

The present invention has been addressed to the said problem and provides a solution thereof in the form of new vitamin A aldehyde derivatives, namely, quaternary derivatives of the retinylidene acylhydrazines, which satisfy the requirements of the art as to properties (solid form, solubility, stability).

The new quaternary derivatives of the present invention are the trimethyl-(retinylidene-hydrazinocarbonyl)-ammonium chloride and the (retinylidene-hydrazinocarbonylmethyl)-pyridinium chloride.

According to the present invention, the new retinylidene acylhydrazino quaternary compounds are prepared by reacting vitamin A aldehyde or a substance containing the same with appropriate acylhydrazines. The vitamin A aldehyde may be used in the pure or substantially pure form or, as indicated, in the form of a substance containing the same, even in a low content. For example, use may be made of the vitamin A aldehyde oil prepared from natural vitamin A concentrate and which has a low content of vitamin A aldehyde. Since the present invention may thus make use of a substance containing vitamin A aldehyde in such a low content in the preparation of the retinylidene acylhydrazino quaternary compounds, the invention is useful in the concentration of vitamin A oil.

The vitamin A aldehyde, starting material, may have any geometrical configuration, the resultant product according to the invention having the corresponding configuration. Thus, where the starting compound has all its double bonds in the trans-configuration, the obtained product will likewise be in the all-trans-configuration.

The reaction between the vitamin A aldehyde and the acylhydrazines is advantageously carried out in a solvent, preferably a lower aliphatic alcohol such as tertiary butanol, isopropanol, ethanol or methanol. However, other solvents may also be used, such for example as ethers such as dioxan, dibutylether and tetrahydrofuran, esters such as ethyl acetate and butyl acetate, fatty acids such as acetic acid, acetonitrile, aliphatic or aromatic hydrocarbons, aliphatic or aromatic nitro compounds, dimethyl formamide, water, and acetic anhydride. If necessary, a mixture of the above solvents may be used. The reaction generally proceeds at room temperature (20 to 30° C.) but it may be accelerated by heating. Addition of a trace of an acid such as sulfuric acid, hydrochloric acid, phosphoric acid, oxalic acid and acetic acid makes the reaction proceed more smoothly. One or more of tocopherol, hydroquinone, and quinoline may be added to prevent side-reactions, such as oxidation and polymerization.

The retinylidene acylhydrazino quaternary compounds thus produced are isolated from the reaction mixture by suitable means. The crude products thus separated are generally crystalline substances, which are purified by recrystallization from a proper solvent.

The new compounds of the present invention are very useful because of their vitamin A activity. They are stable crystalline compounds and therefore satisfy the desideratum of having the products in solid form. Moreover, they are soluble in water and therefore satisfy the object of solubilization of vitamin A.

The new compounds are useful in the treatment of vitamin A deficiency, and for all other purposes for which vitamin A is useful. They may be administered orally, an appropriate dose being e.g. 25,000 to 50,000 I.U./day. Moreover, the compounds are also useful, by making use of the afore-specified properties, in the fortification of foods such for example as margarines, dairy products, canned goods and confectionery.

The following examples set forth exemplary and presently-preferred embodiments of the invention. These examples are intended to be illustrative and not at all limitative in character. In the said examples, the percentages are by weight, unless otherwise indicated. The temperatures are in degrees centigrade. Melting points are uncorrected. All of ultraviolet absorptions appearing in the examples were observed in ethanol solution. The stability was tested by leaving 0.37–0.40 g. of the sample in a brown glass tube with a diameter of 1.5 cm. at 40° C., without sealing, and the residual content at the end of 30 days is shown in percentage. The vitamin A activity of the samples was assayed by the method of U.S.P. XIV, and the potency of 1 mol of the samples was compared with that of 1 mol of vitamin A. All were found to have vitamin A activity.

The vitamin A aldehyde (purity, ca. 45%) used in each example except when particularly noted was produced by manganese dioxide oxidation of concentrated vitamin A alcohol obtained from cod liver oil. The ratio of neovitamin A aldehyde (2-monocis) to all-trans vitamin A aldehyde is approximately 1:2 (cf. Ch. D. Robeson and J. G. Baxter: J. Am. Chem. Soc. 69, 136 (1947)).

Example 1

To 1.42 grams of vitamin A aldehyde oil are added 0.84 gram of trimethylcarbonylhydrazinomethyl ammonium chloride (Girard's reagent T) and 10 milliliters of ethanol, and the mixture is boiled for 20 minutes and then allowed to stand for two hours. The mixture is cooled and the separated crystals are washed with ethanol to give trimethyl-(retinylidenehydrazinocarbonylmethyl)-ammonium chloride, as yellow crystals, M.P. 215° (decomp.). The product is soluble in water.

Ultraviolet absorption: $\lambda_{max}$ 384 m$\mu$ ($\epsilon$=65,000).

Example 2

To 2.0 grams of vitamin A aldehyde oil are added 1.3 grams of hydrazinocarbonylmethylpyridinium chloride (Girard's reagent P) and 10 milliliters of ethanol, and the solution is boiled for 20 minutes. The solution is then cooled and the separated crystals are collected by filtration, and recrystallized from ethanol to give 1 gram of (retinylidene - hydrazinocarbonylmethyl)-pyridinium-chloride melting at 210° (decomp.). The product is soluble in water.

Ultraviolet absorption: $\lambda_{max}$ 379 m$\mu$ ($\epsilon$=50,000).

*Analysis.*—Calcd. for $C_{27}H_{36}ON_3Cl$: C, 71.42%; H, 7.99%. Found: C, 71.27%; H, 7.86%.

The present application is a division of copending application Serial No. 671,732, filed July 15, 1957.

Having thus disclosed the invention what is claimed is:

1. Trimethyl-(retinylidene - hydrazinocarbonylmethyl)-ammonium chloride.

2. (Retinylidene-hydrazinocarbonylmethyl)-pyridinium chloride.

No references cited.